United States Patent [19]

Wetzig

[11] 4,183,599
[45] Jan. 15, 1980

[54] VEHICLE AIR AND ELECTRICAL CONNECTOR

[76] Inventor: Lloyd M. Wetzig, 465 N. 22nd St., Springfield, Oreg. 97477

[21] Appl. No.: 889,187

[22] Filed: Mar. 23, 1978

[51] Int. Cl.² ............................................. H01R 3/04
[52] U.S. Cl. ........................................ 339/15; 339/10; 339/49 R; 339/177 R; 285/68
[58] Field of Search ..................... 339/15, 16 R, 16 C, 339/49 R, 10, 91 P, 177 R; 285/68

[56] References Cited

U.S. PATENT DOCUMENTS

| | | | |
|---|---|---|---|
| 3,523,266 | 8/1970 | Wetzig et al. | 339/49 R X |
| 3,673,541 | 6/1972 | Volinskie | 339/16 R |

Primary Examiner—Roy Lake
Assistant Examiner—DeWalden W. Jones
Attorney, Agent, or Firm—Seed, Berry, Vernon & Baynham

[57] ABSTRACT

A coupling for air and electrical connections between a vehicle and a trailer having two telescopically connected cupped sections with concentric sealed air passages when the sections are interconnected. Both the electrical and pneumatic connections are made simultaneously with the telescopic interconnection.

4 Claims, 7 Drawing Figures

VEHICLE AIR AND ELECTRICAL CONNECTOR

BACKGROUND OF THE INVENTION

1. Field of the Invention

This invention pertains to composite air and electrical couplings designed for use particularly in the operation of truck-trailer units.

2. Description of the Prior Art

U.S. Pat. No. 3,523,266 illustrates a composite air and electrical coupling in which a single air line of the vehicle can be coupled to the air line of the trailer. More recent tractor-trailer rigs, however, have required two pneumatic connections. The recent tractor-trailer rigs have a pneumatic reservoir for providing power or actuating air to the brakes on the trailer and a control air valve which can be controlled from the vehicle cab to allow air to flow from the reservoir to the brakes and to vent the brakes when the brakes are deenergized. The details of these tractor-trailer air-actuated units are conventional and will not be further described. Suitable systems are manufactured by Bendix-Westinghouse Automotive Air Brake Company of Alyria, Ohio, U.S.A.

SUMMARY OF THE INVENTION

It is an object of this invention to provide a composite electrical and air coupling which can simultaneously interconnect two air lines and the electrical lines between a tractor and trailer.

It is another object of this invention to provide a composite air and electrical connector which is inexpensive to manufacture, easy to use and requires little maintenance.

Basically these objects are obtained by providing a vehicle cupped section and a trailer cupped section which sections are laterally telescopically interconnected together. Each section is provided with a pair of concentrically located air passages and electrical terminals which interconnect with coaxially aligned passages and terminals of the opposite sections. The operator is thus able with a single motion to quickly interconnect all of the necessary air and electrical lines between the tractor and trailer. Secondly, the coupling assures that improper hook-up of the air brake system cannot occur as happens with conventional couplings.

DETAILED DESCRIPTION OF THE PREFERRED EMBODIMENT

Figure 1:
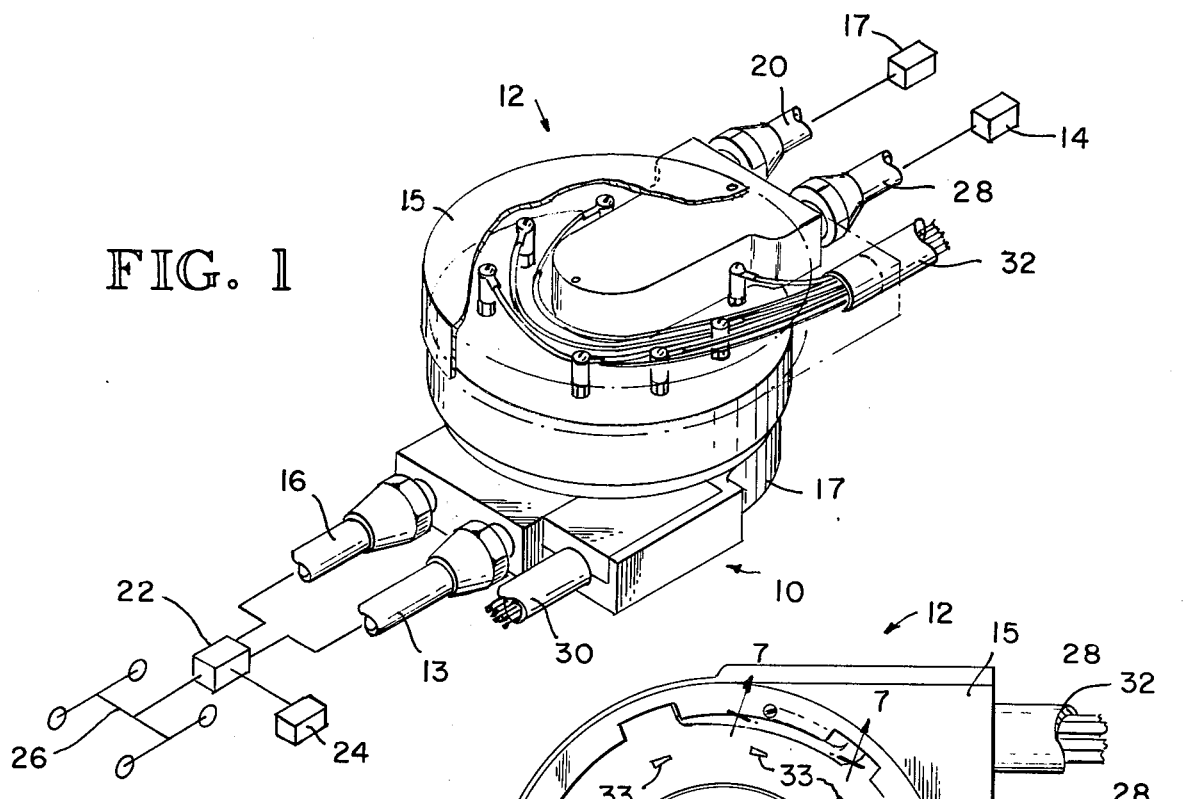
FIG. 1 is a perspective of a preferred embodiment of the coupling.
Figure 2:
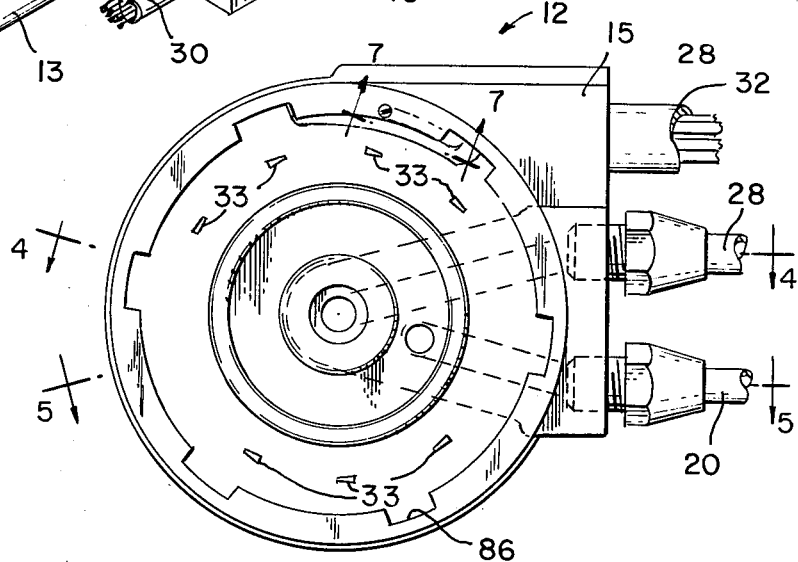
FIG. 2 is a bottom plan of the tractor section of the coupling.
Figure 3:
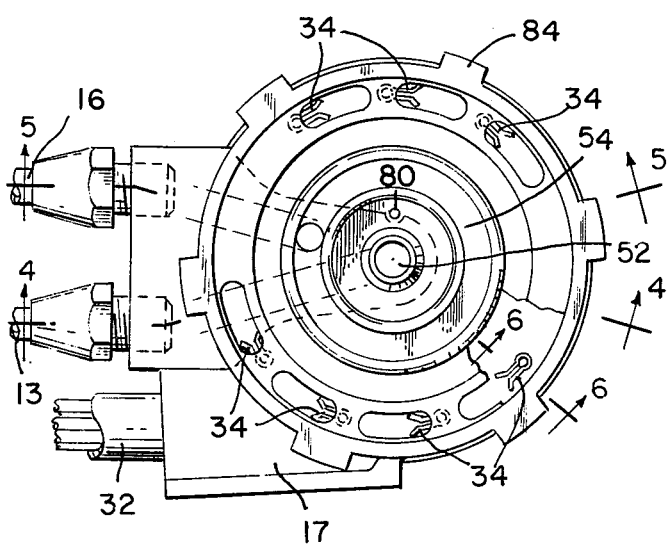
FIG. 3 is a top plan of the trailer of the section of the coupling.
Figure 4:
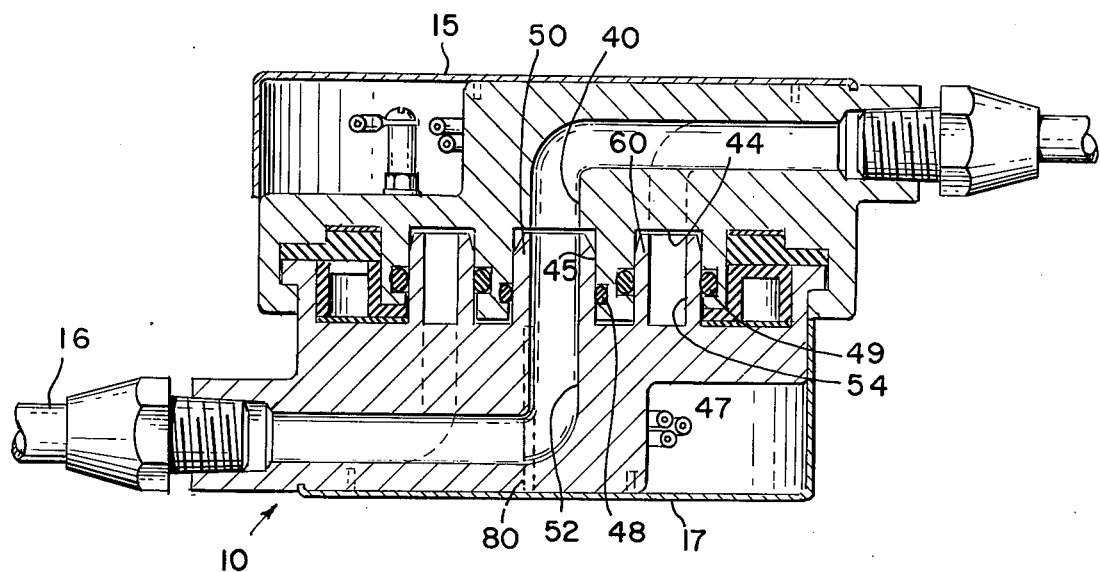
FIG. 4 is a fragmentary axial section taken along the line 4—4 of FIG. 2.
Figure 5:
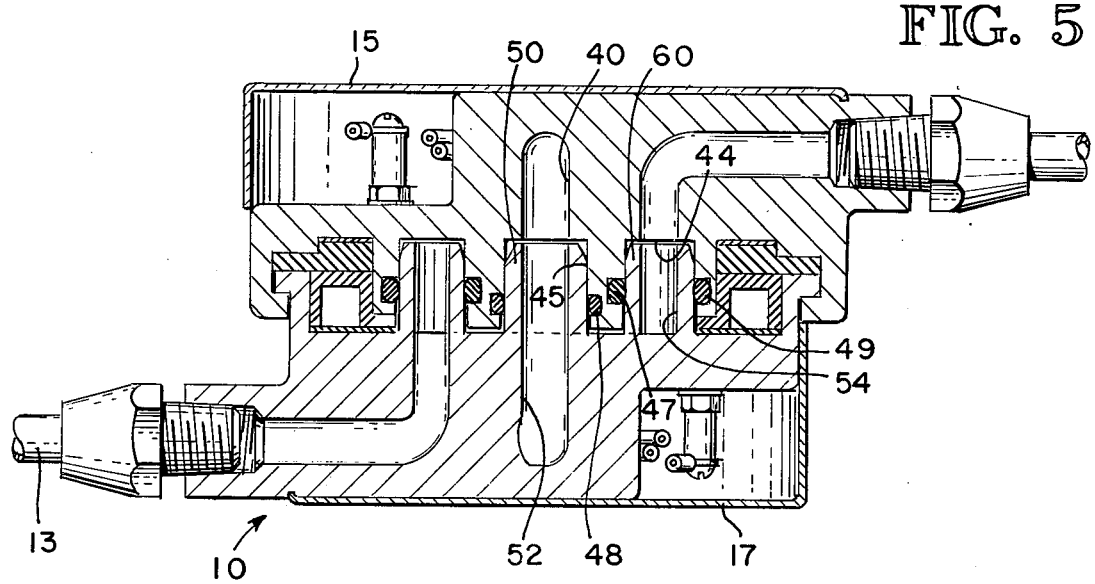
FIG. 5 is an axial section taken along the line 5—5 of FIG. 2.
Figure 6:
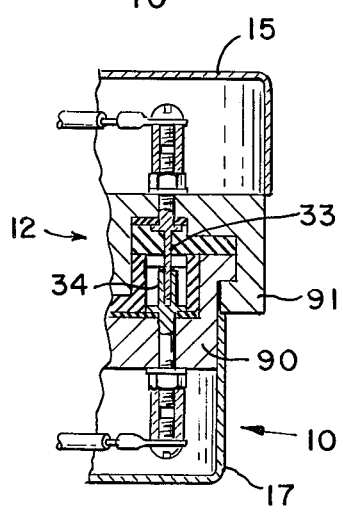
FIG. 6 is a fragmentary section taken along the line 6—6 of FIG. 3 but showing both sections.
Figure 7:
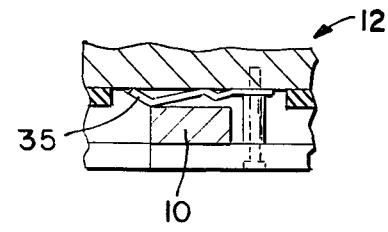
FIG. 7 is a fragmentary side elevation of the coupling taken along line 7—7 of FIG. 2.

As best shown in FIG. 1 the coupling comprises a trailer cupped section 10 and a vehicle cupped section 12. The trailer section is adapted to be coupled to line 13 which is connected to a control valve 22 on the trailer. A conduit 16 is coupled to the control valve 22 also.

The tractor section 12 is coupled to a conduit 20 that connects to a control valve 17 in the tractor cab. A conduit 28 is coupled to the section 12 and supplies power air to the reservoir 24 from a compressor 14 via valve 22. As is well known, the control valve 22 when actuated with control air will direct supply air to the brakes from the reservoir and when deactuated will allow the brakes to be vented to atmosphere to release the brake shoes.

Electrical lines 32 from the vehicle are coupled to electrical lines 30 on the trailer via pin couplings 33 which are on the tractor cupped section and which slidably engage into clip couplings 34 in the trailer cupped section as the two sections are telescopically and rotatively interconnected. A spring clip 35 helps to hold the coupling together in its proper point of locking. It can also serve as a ground contact if the coupling body is connected to the ground system of the two vehicles. The two sections are otherwise electrically isolated by insulators 90 and 91.

Tractor section 12 is provided with a center passage 40 and a concentric outer chamber 44. An inner chamber 45 connects with the center passage. The two chambers are separated by a concentric ring having O-ring seals 47 and 48. The trailer cupped section 10 is provided with a center tube 50 having a central passage 52 that fits within the chamber 45 and fits tightly against the O-ring seal 48. The trailer cupped section also has a concentric chamber 54 that is separated from the tube 50 by a flange 60. The flange engages the O-ring seal 47 and an outer O-ring seal 49. The chamber 52 is connected to a passage that goes to the supply air conduit 13, whereas the passage 52 goes to the control air conduit 16. A small vent hole 80 is provided in the end wall surface of section 10 so that as the two sections are joined the air trapped at the opposed surfaces can escape allowing the two sections to be easily telescoped together.

The two sections are locked together through mating lugs 84 and recesses 86. If desired, one of the lugs and recesses can be smaller than the other to assure proper alignment of the two sections. When the tractor is connected to the trailer and the electrical and air connections are to be made the operator in a single operation may telescope and lock the two sections together to complete all of the necessary air and electrical connections.

While the preferred embodiments of the invention have been illustrated and described it should be understood that variations will be apparent to one skilled in the art. Accordingly, the invention is not to be limited to the specific embodiment illustrated in the drawing.

I claim:

1. A composite air and electrical coupling for a vehicle having a plurality of electrical inputs, an air supply and a control air conduit and a trailer having a plurality of electrical outlets, an air reservoir, a control air conduit and air actuated brakes, comprising:

a hollow case formed in two laterally telescoping vehicle and trailer sections, means releasably locking the two sections together, said vehicle cupped section having first energizing air passage means adapted to be connected to the air supply on the vehicle and separate first control air passage means adapted to be connected to the vehicle control air conduit, said trailer section having second energizing air passage means adapted to be connected to said air reservoir for providing supply air to actuate said brakes and separate second control air passage means adapted to be connected to an air control valve on the trailer for directing air from the reservoir to the brakes, said first and second energizing passage means and said first and second control air passage means being respectively coaxially aligned whereby the lateral telescopic interconnection of the two sections automatically couples the respective passages in operative communication with each other, each said section having electrical terminals, and electrical interconnection means for electrically interconnecting the terminals when the two sections are telescopically interconnected.

2. The coupling of claim 1, said first and second energizing and control air passage means including concentric inner and outer coaxial chambers separated by sealing means.

3. The coupling of claim 2, said inner and outer chambers of said vehicle section being separated by a concentric ring, said sealing means including O-ring seals on opposite surfaces of said ring, said inner and outer chambers of said trailer cupped section being separated by a circular recess having opposed sidewalls engageable with said O-ring seals when said sections are interconnected for preventing leakage between passage.

4. The coupling of claim 3, including a vent opening in said recess for providing an exhaust passage for said ring and recess when said sections are telescopically closed.

* * * * *

UNITED STATES PATENT OFFICE
CERTIFICATE OF CORRECTION

Patent No. 4,183,599  Dated January 15, 1980

Inventor(s) Lloyd M. Wetzig

It is certified that error appears in the above-identified patent and that said Letters Patent are hereby corrected as shown below:

In Claim 1, at col. 2, line 65 of the patent, delete the word "cupped."

Signed and Sealed this

Second Day of February 1982

[SEAL]

Attest:

Attesting Officer

GERALD J. MOSSINGHOFF

Commissioner of Patents and Trademarks